(No Model.)
J. W. RIGLANDER.
SPECTACLE FRAME.
No. 303,188. Patented Aug. 5, 1884.
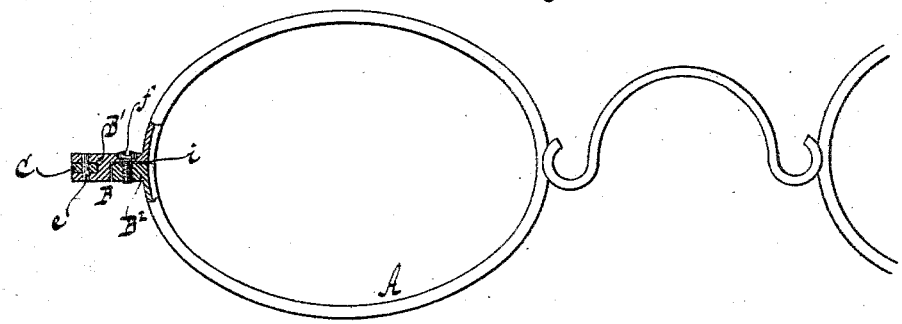
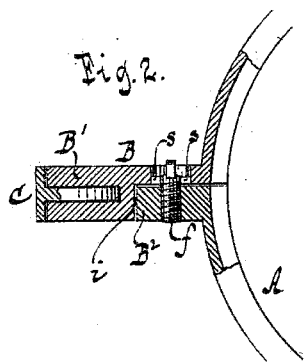
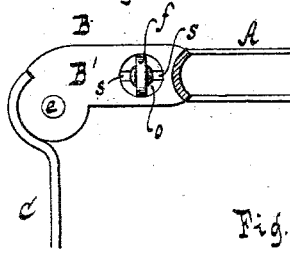   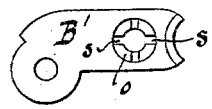
WITNESSES:
Otto Hufeland
William Miller
INVENTOR
Jacob W. Riglander
BY
Van Santvoord & Hauff
ATTORNEYS

United States Patent Office.

JACOB W. RIGLANDER, OF NEW YORK, N. Y.

SPECTACLE-FRAME.

SPECIFICATION forming part of Letters Patent No. 303,188, dated August 5, 1884.

Application filed May 22, 1884. (No model.)

*To all whom it may concern:*

Be it known that I, JACOB W. RIGLANDER, a citizen of the United States, residing at New York, in the county and State of New York, have invented new and useful Improvements in Spectacle-Frames, of which the following is a specification.

My invention relates to the side pieces connecting the temples to the eye-wires of spectacle-frames; and it consists in the novel features of construction hereinafter described, whereby the eye-wires may be adjusted to the lenses without disturbing the joints of the temples.

In the accompanying drawings, Figure 1 is a front view, partly in section, of a portion of a spectacle-frame embodying my invention. Fig. 2 is a similar view on a larger scale than in the previous figure. Fig. 3 is a plan or top view, partly in section. Figs. 4 and 5 are detail views of parts.

Similar letters indicate corresponding parts.

The letter A designates an eye-wire, B a side piece, and C a temple. The side piece, B, is made in two sections, B' B², to which the eye-wire A is attached in any usual or suitable manner, and one of which, B', extends the entire length of the side piece to connect with the temple, while the other, B², extends a portion of the length thereof. The section B' is formed with a mortise, C', to receive the temple C, and the latter is secured in the mortise by means of a joint-pin, $e$, for its connection to the side piece; but it is evident that the temple may be placed on either side of the proper section, omitting the mortise. The section B² is united to the section B' by means of a set-screw, $f$, and at the point where the sections meet the section B' is formed with a recess, $i$, of a depth equal to the thickness of the section B², to receive this section, so that it is flush with the section B', and the whole is rendered smooth or even. This purpose, however, can also be accomplished by making the section B² of equal length to the section B'. The thickness of the section B² is greater than that of the adjacent portion of the section B', and hence the set-screw $f$, which passes from the section B' into the section B², may be withdrawn from the latter a considerable distance for adjusting the eye-wire to the lens without disconnecting the sections, which obviously facilitates the operation of inserting the lens. It will be noticed that in the adjustment of the eye-wire by means of the set-screw $f$ the joint of the temple C with the side piece is left entirely undisturbed, and consequently the necessity of readjusting the temple, as in ordinary frames, is obviated. The section B' is countersunk on the outer surface to form a shoulder, $o$, Figs. 2, 3, and 4, upon which rests the head of the set-screw $f$, which head is flattened in the plane of the screw for its passage through coincident notches $s\ s$ in the edge of the shoulder $o$, so that the sections B' B² may be disconnected when desirable without removing the screw, the latter being simply adjusted to bring its head opposite to the notches $s\ s$, when the sections may be sprung apart from each other. It is evident that the set-screw, with its flat head, to pass through the notches $s\ s$ and rest on the shoulder of the countersink, is applicable also to eyeglass-frames.

I am aware that it is not new to construct the side piece of the eye-wire in two sections, one having a mortise, in which the temple is pivoted by a pin disconnected from the other section, the two sections being held together by a pivoted clasp, and such, therefore, I disclaim. I am also aware that the side pieces of the eye-wire have been made in sections connected by a screw, the temple being pivoted between the sections by a pin fixed at its ends to the respective sections; but such is the construction which my invention improves.

What I claim as new, and desire to secure by Letters Patent, is—

1. The combination, substantially as hereinbefore described, of the eye-wire A, the temple C, the side piece, B, made in two sections, one of which, B', is formed with a mortise, in which the temple is pivoted by a pin, $e$, disconnected from the other section, B², and the set-screw $f$, passing loosely through one section and screwing into the other section, whereby the eye-wire may be adjusted to the lens without loosening the joint of the temple.

2. The combination, substantially as hereinbefore described, of the eye-wire A, the temple C, the side piece, B, made in two sections, B' B², one of which, B', is formed with a mortise, in which the temple is pivoted by a pin, $f$, disconnected from the other section, B², the latter having a countersunk portion to form the depressed shoulder o, and the set-screw f, passing loosely through the shoulder, with its head resting thereon and screwed into the other section, whereby the eye-wire may be adjusted to the lens without disconnecting the side pieces or loosening the temple-joint.

3. The combination, substantially as hereinbefore described, with the eye-wire and the temple, of the side piece, made in two sections, one of which extends the entire length thereof, and is constructed with a recess to receive the other section, the latter having a greater thickness than the adjacent portion of the recessed section, and the set-screw passing from the recessed section into the plain section for uniting the sections.

4. The combination, substantially as hereinbefore described, with the eye-wire, of the side piece, made in two sections, one having a countersink provided with notches in the edge thereof, and the set-screw for uniting the sections, having a flat head adapted to pass through the notches and rest on the shoulder of the countersink.

In testimony whereof I have hereunto set my hand and seal in the presence of two subscribing witnesses.

JACOB W. RIGLANDER. [L. S.]

Witnesses:
WM. FAUSTMANN,
LEONARD KOHN.